United States Patent [19]

Knoll et al.

[11] 3,950,826

[45] Apr. 20, 1976

[54] RESTRAINT HARNESS ADJUSTER

[75] Inventors: Frank Knoll, Huntington Station; George Skridul, Huntington, both of N.Y.

[73] Assignee: East/West Industries, Inc., Farmingdale, N.Y.

[22] Filed: Aug. 7, 1975

[21] Appl. No.: 602,650

[52] U.S. Cl. .................................. 24/171; 24/194; 297/385; 24/262 R; 24/263 SB
[51] Int. Cl.² .................... A44B 11/10; A47C 31/00
[58] Field of Search ............... 24/171, 194, 263 SB, 24/263 SN; 297/385

[56] References Cited
UNITED STATES PATENTS

| | | | |
|---|---|---|---|
| 3,276,085 | 10/1966 | Spranger | 24/171 |
| 3,344,486 | 10/1967 | Eveland | 24/194 |
| 3,587,140 | 6/1971 | Gaylord | 24/171 |

*Primary Examiner*—Bernard A. Gelak

[57] ABSTRACT

A seat belt system is disclosed for mounting relative to the seat assembly of a vehicle which includes one or more harness restraint adjuster devices having retaining means including a pair of cooperating clamping members for engagement with opposite sides of the webbing belt. The clamping members are normally closed on the belt to anchor it in a fixed position, but manual release means allows for disengagement of the clamping members to vary the length of the seat belt system. The belt is free to move within the restraint adjuster in one direction without any need to utilize the release means, and the retaining means automatically reclamps itself against the belt when the adjustment is completed.

Guide means including spaced apart fixed bearing surfaces are assembled to side members of the support means and are so located as to limit the forward translation of the clamping members while there is tension in the springs. The sloping surface of clamping members cam against the guide rods so that verticle displacement of the clamping members takes place. Elongated slots in the guide plates provide verticle freedom so that the clamping members tend to come together under the influence of the force provided by the springs.

30 Claims, 8 Drawing Figures

RESTRAINT HARNESS ADJUSTER

BACKGROUND OF THE INVENTION

The restraint adjuster or slide-buckle is a device forming part of a seat belt system whose function is the adjustment of the length of the belt, harness or webbing and the device employs retaining means including a pair of cooperating jaw members mounted in operative relation to guide means including inclined bearing surfaces. The jaw members are movable in a housing means in one direction toward a clamping position in which the jaw members, with the belt therebetween, are wedged between the inclined bearing surfaces to retain the belt in fixed position, and, by movement of the belt in the opposite direction therebetween, the jaw members are separable to allow the belt to freely move between them.

A key feature of this invention is the selection of a critical angle for the sloping surface of the clamping members together with a critical set of locations for the guide rods. Although a comfortable tolerance latitude exists on the choice of angle, the angle must be chosen so as to exceed a critical value, below which the force required to pull the release means becomes excessive. Similarly, for the locations of the guide rods, they need only be placed so their centers lie on a pair of lines parallel to the clamping member angle; however, in this invention they have been so placed that minimum overall height of the housing is achieved, also.

DISCUSSION OF THE PRIOR ART

Applicants, in making the present invention, were aware that various attempts in the past have been made to provide restraint harness adjustments, some of which are embodied in the patented prior art and others contained in existing products in use today. Applicants were interested in perfecting a system that would extend the reliability of the present designs as well as being of a more economical construction and having features not contained in the prior art.

The patent, known to applicants, that is believed to best illustrate the patented prior art is U.S. Pat. No. 3,587,140 issued June 28, 1971, and assigned to H. Koch & Sons, Inc. Subsequently, certain changes were made in the "Web Adjuster" disclosed in said patent, and the commercial unit marketed by H. Koch & Sons, Inc., which is hereinafter referred to as the "Koch" web adjuster, is discussed herein.

Applicants being aware of the Koch web adjuster, found certain shortcomings therein, and set out to and did overcome the prior art problems. Applicants' restraint harness adjuster, is a webbing adjuster similar to the Koch webbing adjuster in function, but the design is different in many important ways.

The housing cover of applicants' restraint harness can be made in two ways. The first, which is preferred, is of a high impact Delrin-type plastic. This cover can be molded to affort the maximum strength in areas where it is required. The lower slot bar on this cover has been eliminated so that field retrofit of the triple fold webbing can be easily installed.

The Koch cover is a more complex-type cover made of aluminum with the top surface being cut out to reduce the height of the unit. The front slot of the cover does not permit field installation of the triple fold webbing assemblies without resewing of the webbing harness after installation. Applicants' restraint harness uses six standard 0.187 diameter pins which make the unit cheaper to fabricate than the Koch fitting. The pins in applicants' restraint harness react to the shear and the bending loads directly while the Koch unit employs 0.125 inch diameter pins with rollers to take out their shear load and the slides react to take the bending loads. These rollers ride in the machined slots in the housing which restrict the motion of the slides in a clamp-up position. This has an adverse effect of allowing the webbing to slip. Under high loads this has a tendency to locally brinell the housing material. This does not occur in applicants' unit due to the fact that the unit has been designed with a zero clearance under load, thus, no slippage of the webbing can occur.

The jaw members in applicants' unit are identical and interchangeable with each other. This makes the unit price of the jaw members much cheaper. The jaw members in the Koch fitting are two different sizes. This makes the unit more difficult to assemble and it does not idiot-proof the item. Applicants' slides are designed with approximately an 8° 15' taper to obtain the self-releasing feature. The slides in the Koch fitting are rectangular in shape and their self-releasing angle is accomplished by means of slots in the housing.

Applicants' restraint harness cover is retained by four self-locking screws. The pin and roller combinations are readily accessible for ease of installation. On the other hand, the Koch fitting's rear pin/roller combination has a tapped hole which does not lend itself for ease of maintenance. There is a tendency of the two locking screws to cause a rotation of the pin which does not permit removal of the pin/roller. In some cases, the person disassembling the unit has to drill out the screws to accomplish this operation.

The guide plates in applicants' restraint harness assembly initiate the movement of the jaw members to engage the webbing assembly directly. Whereas, the Koch fitting has a spring attachment directly to the upper jaw member to create this situation. The guide plates act only as a holding device to hold the jaw members in position relative to each other.

OBJECTS OF THE INVENTION

An object of the invention is to provide a seat belt system having a slide buckle forming part thereof that is readily adjustable.

Another object of the invention is to provide a seat belt adjuster so constructed as to be positive and efficient in operation, quick and easy to release, pleasing in appearance, and economical to manufacture.

Another object is to provide a restraint harness adjuster having gripping jaws that may be moved toward and away from each other for positively gripping a belt, strap or the like without injuring the same when the jaws are moved together and a pull exerted thereon, and quickly release the belt, strap or the like when the jaws are moved away from each other, such release being accomplished by an easy pull on the jaws by means of a belt, strap or the like.

Another object is to provide a slide-buckle having means for moving said jaws toward and away from each other for gripping and releaseing the belt, strap or the like.

Another object is to provide a slide-buckle having upper and lower gripping jaws slidably mounted from an open to closed position, and in the closed position an increase in the gripping action is obtained when an outward force is applied to the belt, strap or the like.

Another object is to provide a slide-buckle having means so positioned as to be instantly available and accessible for quick release and adjustment of the belt, strap or the like for safety purposes for instant loosening of the gripping means to release an occupant of an aircraft, for a quick escape from a burning plane, and other emergencies requiring a quick release for individuals wearing a safety belt or the like.

Another object is to provide a slide buckle adapted for any general use where a belt, strap or the like is used for holding parts together.

Other objects, advantages and capabilities inherently possessed by the invention will later more fully appear.

SUMMARY OF THE INVENTION

The broad purpose of the present invention relates to a seat belt assembly for a vehicle including a "restraint adjuster" or "slide-buckle" and generally referred to as such for convenience, employing clamping jaws as a means for retaining the length of the seat belt in selected positions.

The slide-buckle, is a device whose function is the adjustment of the length of a harness belt or webbing assembly such as one which may function as a harness restraint for holding a human torso to a seat. Its usefulness is not necessarily confined to a seat-belt assembly or torso retraint applications but for convenience will be so illustrated.

In order to appreciate the function and operation of the restraint adjuster, consider as an example the application wherein one end of the belt assembly is firmly affixed to the side of a seat, and that a buckle is attached to the corresponding side of a torso harness worn by the user when seated. Two such webbing adjuster or slide-buckle assemblies would be required, one on the left side and the other on the right side, to hold and restrain the user in the seat under high acceleration conditions with a buckle therebetween to permit the assembly to be opened for the user thereof to initially be seated. Tension exists between the belt assembly and buckle under acceleration conditions, and it is a requirement that no slippage of the adjuster occur under a maximum specified tensile force.

The restraint device is employed with a belt having a lower portion connected by coupling means for fixed attachment to the vehicle at one end thereof and its other end connected to the buckle which in turn is adapted to be connected to the other side of the torso harness worn by the user. The end of the lower portion cooperating with the buckle continues as the intermediate portion or end disposed between the clamping members or jaws of the slide-buckle which in turn continues as the upper portion or end which can be grasped by the user. The upper portion or end of the belt assembly is a loose flap long enough to permit adjustment of the length of the belt assembly between the respective ends over a suitable range to accommodate various size individuals. The jaws are normally clamped on the belt and are opened only to allow the user to vary the length of the assembly to adjust to the size of the user. The jaws are supported by mounting means in cooperating relation to each other between guide means including inclined bearing surfaces within the housing means. The mounting means include a pair of spaced apart support members or guide plates with the jaw members contained therebetween in a manner to be freely moveable from an open position for movement of the belt to a closed position. Biasing means which urges the clamping jaws toward a wedged, clamping position in which the length of the belt between the clamping members remains fixed is provided.

Release means having a handle or tab which is a short piece of belt or webbing whose function is the release of the clamping or retaining means so the clamping assembly will freely slide within the slide-buckle is provided. To lengthen the belt assembly, the release means is held taut relative to the housing means thereby overcoming the force being applied by the biasing means in retaining the jaw members in place, and one end of the intermediate belt portion is pulled outwardly from the housing means. To shorten the belt assembly, the free end of the upper portion is pulled without operating the release means outwardly from the housing means, this transmits a force by friction to the jaw members and since this force is in a direction of the diverging direction of the inclined surface a release of the jaw members is automatically obtained.

Accordingly, the user can quickly and easily adjust the point at which the belt is connected to the vehicle to vary the length of its upper portion, either to shorten or lengthen it. If the user desires to lengthen the intermediate portion then by grasping the release means in the form of the flexible handle connected to the jaws and pulling it the clamping members will separate away from their wedged, clamping or closed position. This outward motion of the handle separates the jaw members which are moveable relative to the mounting means. One of the clamping members has the handle connected thereto which allows the user to move the two clamping members to a release position so that the user can pull the belt upwardly.

The restraint adjuster of the present invention may be part of a survival kit in which a torso harness is used as in military applications. Other applications of the device are also within the scope of the present invention.

The arrangement of the clamping jaws in their housing is such that they allow the belt to be either clamped or released by the application of a very nominal effort to open the jaws. In addition, they provide an unyielding connection between the belt and the vehicle when they are in their clamping position. The clamping means includes a pair of spaced apart clamping members or wedges mounted relative to guide means by means of mounting means having support plates with retaining pins. The release means in the form of a handle or tab is assembled to an upper retaining pin, so that a pull on the release means will cause the entire assembly of clamping members and support members to translate in an aftward direction.

The restraint or bias means which may be in the form of springs engage extensions or tabs on the support members and are retained in position relative to the support means in the form of spaced apart flanges, so that tension in the springs tend to translate the entire clamping assembly in a forward direction.

Guide means including spaced apart fixed bearing surfaces, which take the form of rods, are assembled to the side members of the support means and are so located as to limit the forward translation of the clamping members while there is tension in the springs. The front wall of the housing means limits aftward translation of the clamping assembly when the release means is pulled. Also, the tabs on the support members redundantly limit aftward translation by contacting the guide rod extending transversely in the path of travel. The key function of guide rods is to provide camming surfaces for the clamping members so that any forces tending to translate the clamping members forward will create verticle components of force on the clamping surfaces thereby squeezing them together into intimate contact with the belt.

The upper portion of the belt assembly is reeved through one opening in the front wall of the housing means, around the aft roller, through the space between the clamping members, and out through another opening in the rear wall of the housing means. The space between the clamping members is ample to provide full freedom of belt slippage in and out of the openings and around the aft roller during adjustment thereof.

The operation of the adjuster, when the release means has not been pulled, is such that the biasing means in the form of springs pull the clamping members forward. The sloping surface of clamping members cam against the guide rods so that verticle displacement of the clamping members takes place. Elongated apertures or slots in the guide plates provide verticle freedom between the clamping members and the support plates so that the clamping members tend to come together under the influence of the force provided by the springs and, thereby sandwich the belt between the parallel surfaces of the clamping members. Upon application of a pull force upon the intermediate portion of the belt there is an added tendency for the clamping members to be translated forward because of the force of friction between the parallel surfaces of the clamping members and the surface of the belt. Such added forward translation causes additional vertical camming against the guide rods and thereby increases the pinching or compression action of the clamping surfaces against the belt. The greater the pull force of the intermediate portion relative to the clamping means, the greater will be the pinching force; hence there can be no slippage under tension until physical damage occurs to the surface of the belt and/or the clamping members where they are in contact.

To minimize wear and fraying of the belt surfaces during normal use, adjusting and releasing actions frequently repeated, the surface of the clamping members that come in contact with the belt may be coated with a suitable material, such as rubber, urethane, or fabric. This coating provides a high coefficient of friction and also has the strength to withstand the tangetial forces that will exist when the belt is under tension. The bond of the coating to the clamping member surface must also have sufficient shearing strength for this application.

A key feature of this invention is the selection of a critical angle for the sloping surface of the clamping members together with a critical set of locations for the guide rods. Although a comfortable tolerance latitude exists on the choice of angle, the angle must be chosen so as to exceed a critical value, below which the force required to pull the release means becomes excessive. Similarly, for the locations of the guide rods, they need only be placed so their centers lie on a pair of lines parallel to the clamping member angle; however, in this invention they have been so placed that minimum overall height of the housing is achieved, also.

In this manner, a pair of clamping jaws is so arranged as to pinch the belt with increased force as the tension increases. The jaws act as wedges that are cammed by the slight forward motion of the belt as tension increases, and the camming angle is so designed as to maximize the pinch force while maintaining a specified pull force on the release means for freeing the belt after tension has been applied. The gripping surfaces on the clamping jaws consist of rubber (or equivalent) pads whose function is to maintain strong pinching action without allowing fraying of the belt as would generally occur if metallic serrated surfaces were used under certain conditions.

BRIEF DESCRIPTIONS OF THE DRAWINGS

Although the characteristic features of this invention will be particularly pointed out in the claims, the invention itself, and the manner in which it may be made and used, may be better understood by referring to the following description taken in connection with the accompanying drawings forming a part thereof, wherein like reference numerals refer to like parts throughout the several views and in which:

DETAILED DESCRIPTION OF THE DRAWINGS

Hereinafter, in this specification, the term "belt" will be used to indicate generally a belt, harness, webbing, strap or any other elongated part or parts to which the slide-buckle will be applied for gripping and holding them together. Such belt may be a strap worn by an aviator and requiring quick release or adjustment or other release purposes, or an ordinary belt, or a trunk strap, or any other elongated member to which the slide-buckle is adaptable for holding parts together.

Figure 1:
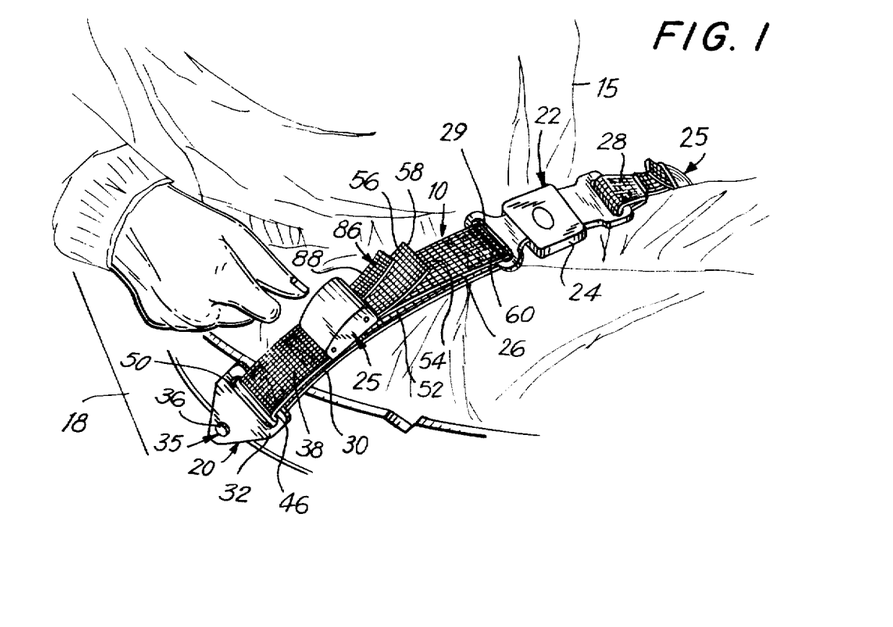
FIG. 1 is a perspective view of the seat belt assembly mounted relative to the seat assembly for retaining an individual therein.

Referring to the drawings in detail, and initially to FIG. 1 thereof, it will be seen that the seat belt or harness assembly generally indicated at 10 is adapted to retain an individual 15, in a seated fixed position relative to a seat assembly 18. The seat belt assembly 10 includes coupling means 20 at each end thereof, only one being shown in FIG. 1, for connecting an elongated safety seat belt in a manner to form a restraining system for the individual 15 with respect to the seat assembly 18.

The assembly 10 includes connecting means 22 in the form of a buckle 24 adapted to join together a first or right belt section 26 and a second or left belt section 28. Each respective section 26 and 28 may have associated therewith a harness restraint or slide-buckle device 25. The buckle 24 may have an elongated opening 29 defined by wall 31 (See Fig. 3) for receiving a looped end of the belt section 26 to permit manual adjustment with respect thereto. In this manner, the slide-buckle 25 permits adjustment of the respective right section 26 and left section 28 of the seat belt assembly 10. The buckle 24 may be maintained substantially in the center of the individual 15. Each belt section 26 or 28 may be identical to each other except for the portions of the buckle 24 associated therewith, which is of an interlocking type and accordingly, only one belt section 26 is hereinafter described in detail.

Figure 2:
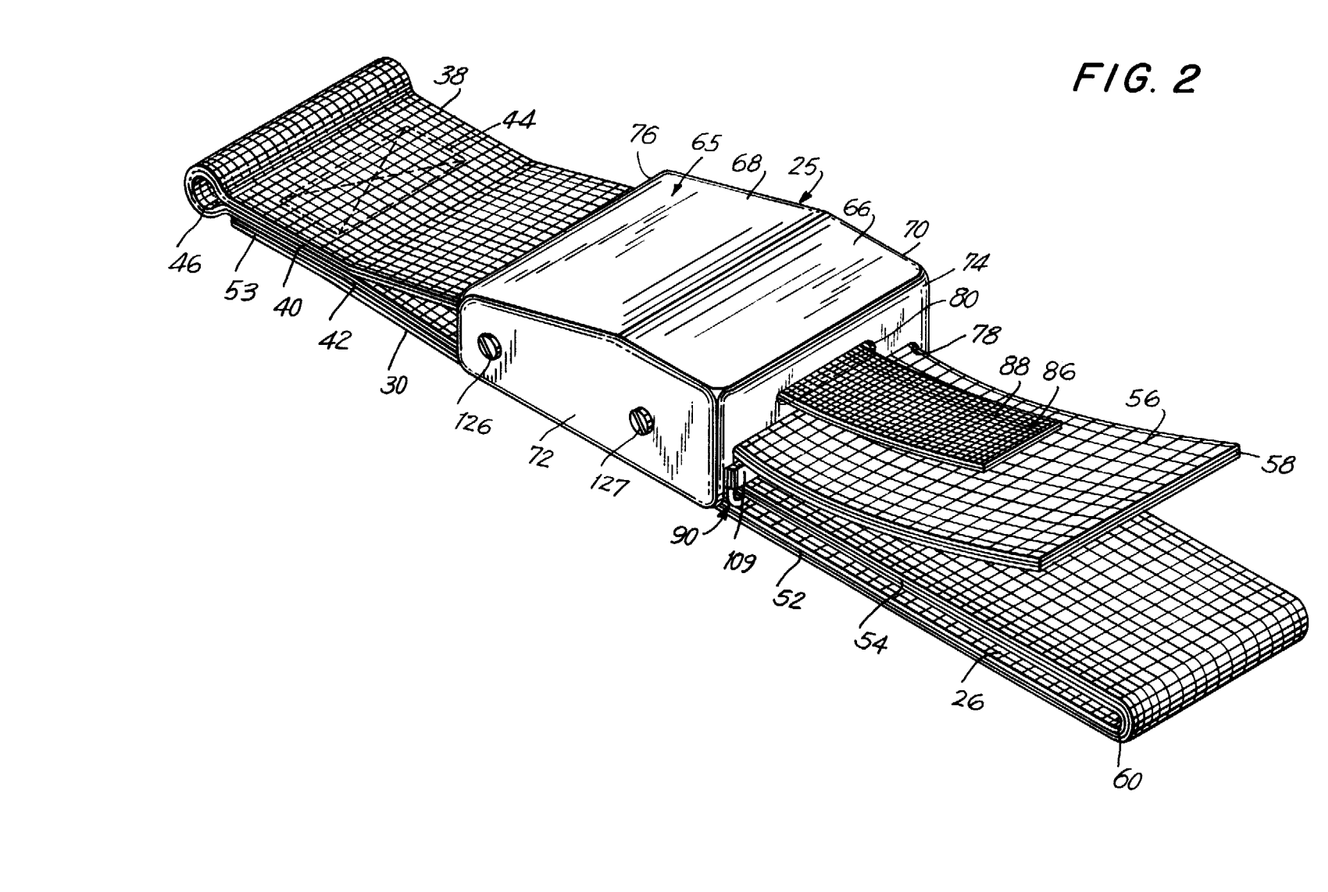
FIG. 2 is a perspective view of the slide-buckle embodying the present invention.
Figure 3:
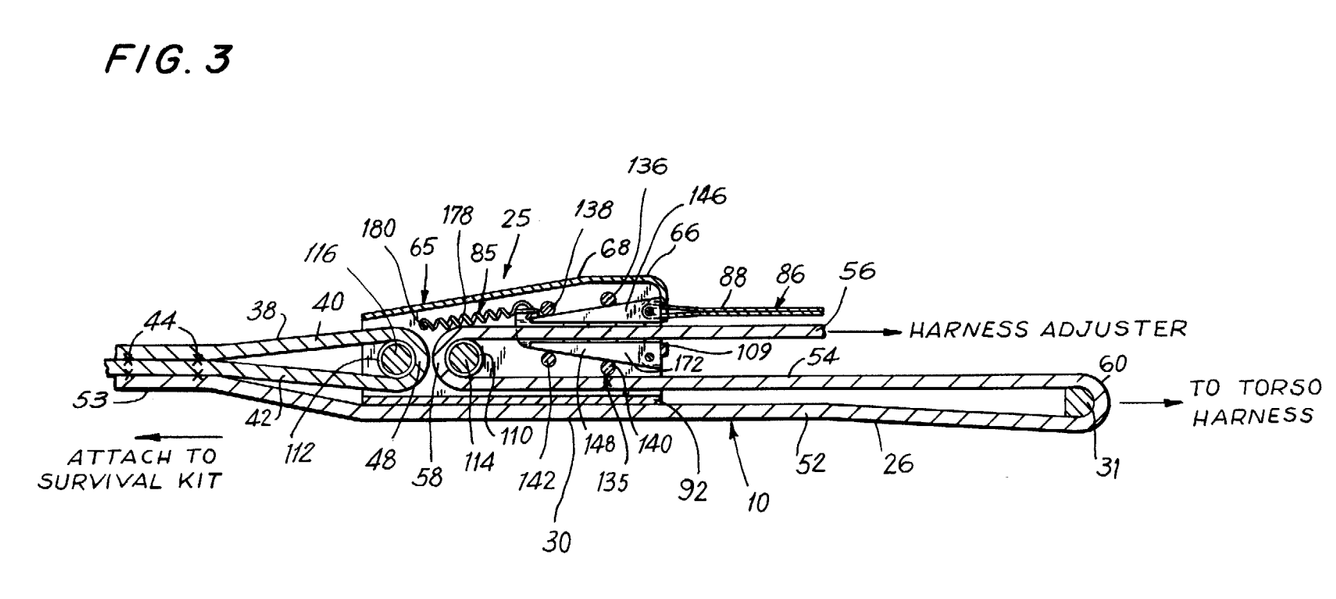
FIG. 3 is a cross-sectional view of the slide-buckle with its cooperating jaws in its retracted unlocked position.

As further illustrated in FIGS. 2 and 3, the right section 26 of the assembly 10 includes an elongated belt 30 connected to the coupling means 20 for connecting one end of the belt section 26 to the seat assembly 18 or some other portion of the vehicle. As seen in FIG. 1, a coupling member 32 is mounted to the seat assembly 18 by securing means 35 in the form of a fastener 36. The belt section 26 at one end thereof is adapted to be connected to the coupling means 20. The manner in which this is accomplished is by providing a belt coupling portion 38 having a top portion 40 and bottom portion 42 extending in overlapping relation to each other and joined together as by stiches 44 to form a loop 46 at one end and loop 48 at the opposite end. Loop 46 extends through an elongated opening 50 contained in the coupling member 32. The opposite end of the belt coupling portion 38 defined by loop 48 is mounted in fixed position to the slide buckle 25 as hereinafter explained in detail. In this manner, linear adjustment may be accomplished by use of each slide-buckle 25 to alter the length of each respective first section 26 and second section 28.

In is appreciated that although a buckle 24 and two slide-buckles 25 are illustrated that it may be desired for economic and other reasons that only one slide-buckle 25 be utilized and that the other free end is attached instead of to the buckle 24, and the buckle 24 in turn connected to the opposite end of the seat assembly 18.

Accordingly, FIGS. 2 and 3 represent the right section 26 of the assembly 10 with the slide-buckle 25 shown thereon and with one end connected to the coupling member 32 and the opposite end adapted to be coupled to the buckle 24. The slide-buckle 25 performs the function of changing the extended length of the right section 26 and, as will be hereinafter explained in detail, the present slide-buckle 25 permits the respective positions of the belt 30 to be adjusted in length. For purposes of reference, the belt 30 is indicated to include a lower portion 52 having a fixed end 53, an intermediate portion 54, and an upper portion 56 having a free end 58. Obviously, the respective dimensions of the upper, lower, and intermediate portions, 52, 54, and 56 respectively, change in length by adjustment of the user. The fixed end 53 of the lower portion 52 of belt 30 is in overlapping relation to the belt coupling portion 38 and connected thereto as by the stiches 44. The remote end 58 of the belt 30 is free for engagement by the hand of the user. The intermediate portion 54 and upper portion 56 form another loop 60 within the slide buckle 25.

Figure 4:
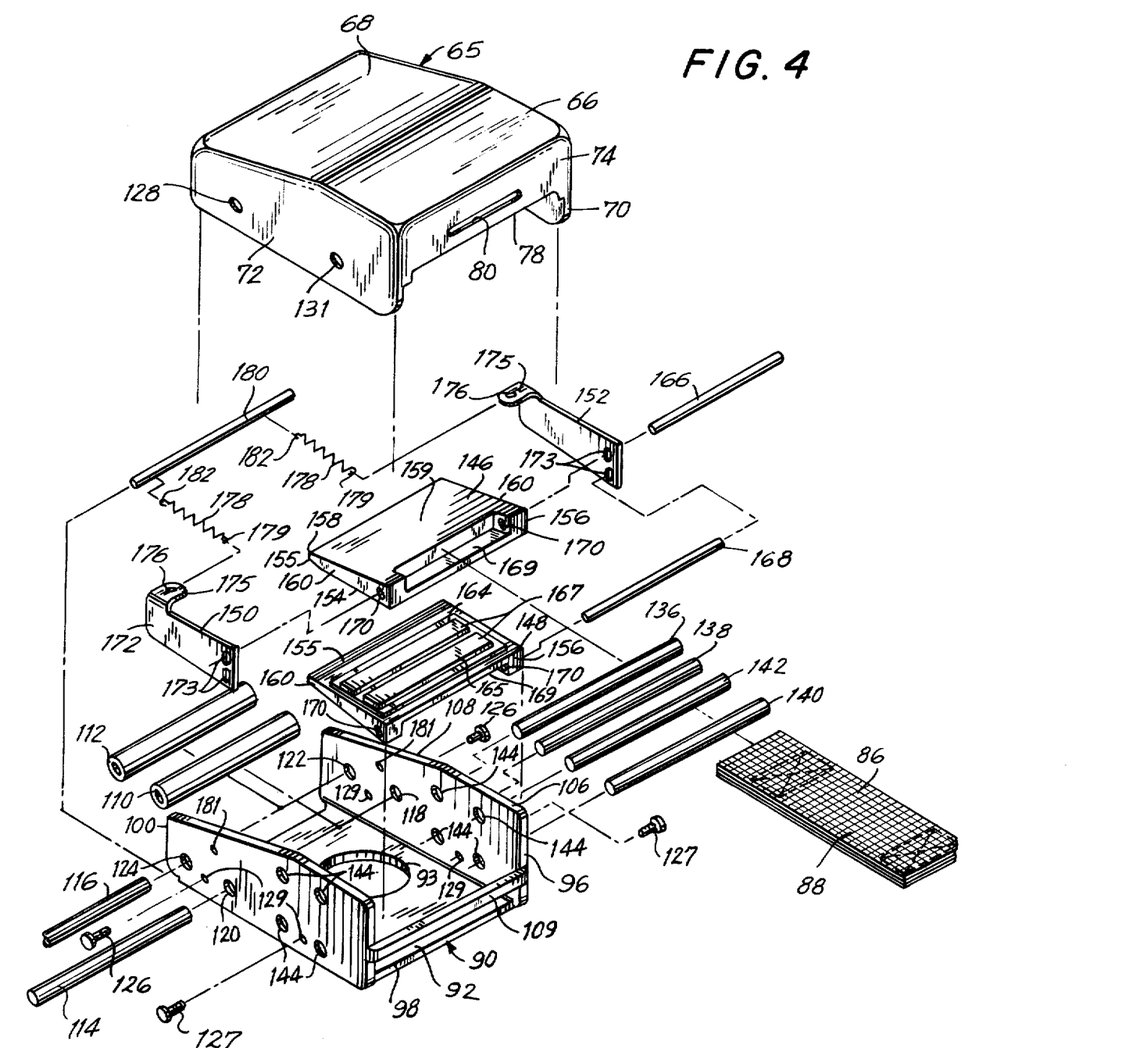
FIG. 4 is an exploded view of the slide-buckle device of FIG. 2.
Figure 5:
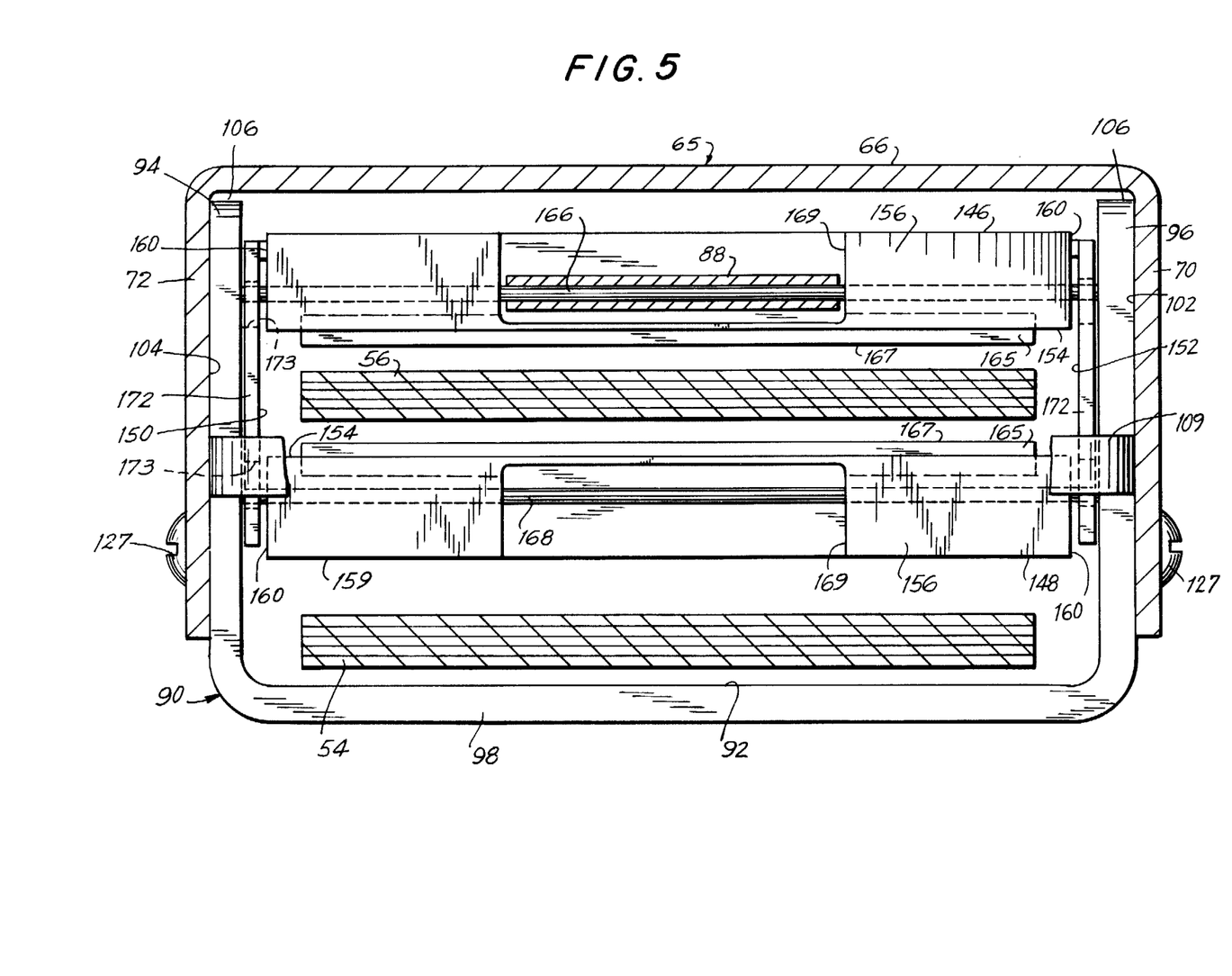
FIG. 5 is an enlarged cross-sectional end view of the slide-buckle.

FIG. 4 best illustrates the various components of the slide-buckle 25 which are hereinafter illustrated in operation with respect to FIGS. 5-8. The housing means 65 may be integrally formed having a cover or top wall 66 with downwardly extending top wall section 68, a pair of spaced apart side walls 70 and 72, and a front wall 74, with all the respective walls joined together. The front wall 74 has an elongated opening or slot 78 to permit the upper belt portion 56 to extend through the housing means 65. A second elongated opening 80 is provided for use in conjunction with the release means 85, having gripping means 86 including a handle 88 extending therethrough. The positionment of the opening 80 on the front wall 74 relative to the gripping means 86 is spaced to permit release of the clamping means. Accordingly, the front end of the housing means 65 as defined by the front wall 74 limits the travel of various assemblies positioned therein.

The housing means 65 has in cooperating relation thereto support means 90 having a base 92 with an opening 93 therein and spaced apart vertically extending flanges 94 and 96 that may be integrally formed therewith, with a front edge 98 and rear edge 100. The opening 93 reduces the weight of the unit 25 and facilitates the casting of the support means 90. The spacing is such that the outer dimension of the flanges 94 and 96 are adapted to be received within the confines of the inner surface 102 and 104 respectively of the side walls 70 and 72 of the housing means 65 (see FIG. 5). The spaced apart walls or flanges 94 and 96 extend at substantially right angles to the base plate 92 and include an upper edge portion 106 and a tapered rear portion 108 to coincide with the shape of the housing means 65. A support member or bar 109 extends horizontally and is joined to the front edge of flanges 94 and 96 such that in assembled relation with the housing means 65 the belt portion 56 may extend therethrough. This is important since the opening defined by the cutout 78 and bar 109 should have a minimum clearance during use. At the same time if it is desired to repair the slide buckle 25 the removal of the housing 65 permits access to the other components.

The support means 90 situated within the housing means 65 further includes anchoring means for supporting the belt coupling portion 38 at loop 48 in a fixed position by providing a forward horizontally supported roller 110. Holding means is also provided in the form of a rear horizontally supported roller 112 which is substantially parallel to the roller 110, and each have a length less than the distance between the flanges 94 and 96. The forward support roller 110 having an inner shaft 114 mounted in coaxial sliding fit relation thereto. The inner shaft 114 extends into the respective bearing apertures 118 and 120 on the side flanges 96 and 94 to support the roller 110 which has associated therewith loop 58 of the intermediate portion 54 and the upper portion 56 of the belt 30. The second roller 112 in similar fashion has a shaft 116 extending between bearing apertures 122 and 124 in the flanges 96 and 98 with the tubular roller 112 mounted on shaft 116 such that the roller 112 is free to rotate relative to the shaft 116. The roller 112 supports the loop 48 of the belt 30 between the top portion 40 and bottom portion 42. Two pair of fasteners 126 and 127 extend through apertures 128 and 131 in side walls 70 and 72 and are held securely in tapped holes 129 extending in each flange 94 and 96. The fasteners 126 and 127 act to retain the housing means 65 in fixed relation to the support means 90.

As seen in FIGS. 5-8 retaining or clamping means 130 is mounted within the housing means 65, between the respective flanges 94 and 96, and operates in conjunction with guide means 135. The guide means 135 is illustrated in the form of an upper inclined surface defined by spaced apart front shaft 136 and rear shaft 138 mounted in a defined angular relationship and a lower front shaft 140 and lower rear shaft 142. All of the shafts 136, 138, 140, and 142, are mounted in apertures 144 on the flanges 96 and 98 and are free to rotate relative thereto to reduce the coefficient of friction of the clamping surfaces moving relative thereto.

The clamping means 130 includes a pair of spaced apart jaw members 146 and 148, which may be identical in construction, that are joined together by means of guide plates 150 and 152, which are mounted in operative relationship to the flanges 94 and 96.

The jaw members 146 and 148 include a lower face or surface 154 with beveled leading edge 155, front surface 156, rear surface 158, upper surface 159, and spaced apart ends 160. The jaw member 146 is dimensioned such that the bearing surface 159 is angularly disposed relative to the lower surface 154 and the bearing surface 159 is adapted to engage the support shafts 136 and 138. The lower surface 154 of the jaw member 146 has associated therewith friction means 162 which is illustrated to be positioned within a cavity or seat 163 and having a bottom portion 164 and parallel spaced apart projections 165 that extend outwardly above the lower face 154 of each respective jaw member 146 and 148 and transversely of the linear movement of the jaw members 146 and 148. The friction means 162 may be secured to the jaw members 146 and 148 in a conventional manner.

The jaw members 146 and 148 are mounted between the respective flanges 94 and 96 by means of a support pin 166 for upper jaw 146 and means of support pin 168 for lower jaw 148. The pins 166 and 168 extend a slight distance beyond the end walls 160 and less than the space between the flanges 94 and 96 so that they are free to ride therebetween. In this manner the pins 166 and 168 are free to move in both a horizontal and vertical plane to the extent permitted by shafts 136, 138, 140 and 142. The upper jaw member has a recess 169 (see Fig. 5) with an aperture 170 extending between the side faces 160. The exposed portion of the shaft 166 in the upper jaw member 146 acts to couple the release means 85 in the form of handle 88 having a loop at one end through which the shaft 166 extends. It is appreciated and understood that the grippiing means 86 may take other forms such as extending through the side of the housing means 65 or some other means of permitting the user to obtain the necessary movement thereof.

The guide plates 150 and 152 each include body portions 172 with a pair of spaced apart openings 173 in vertical relation to each other to receive therein shafts 166 and 168 respectively. In this manner the rear of the upper jaw member 146 and lower jaw member 148 is free to move in a vertical direction. Each guide plate 172 has a tab portion 175 with holes 176 for securement thereto of the restraining means in the form of springs 178 forming part of the release means 85. One end of the spring 178 has a hook portion 179 that extends through the hole 176 and the opposite end of spring 178 has a hook portion 182 that extends around rod 180 (see FIG. 3) that is retained in fixed position relative to the support means 90 by being seated in apertures 181 in flanges 94 and 96. Accordingly, the rod 180 acts as fastening means for the springs 178.

Figure 6:
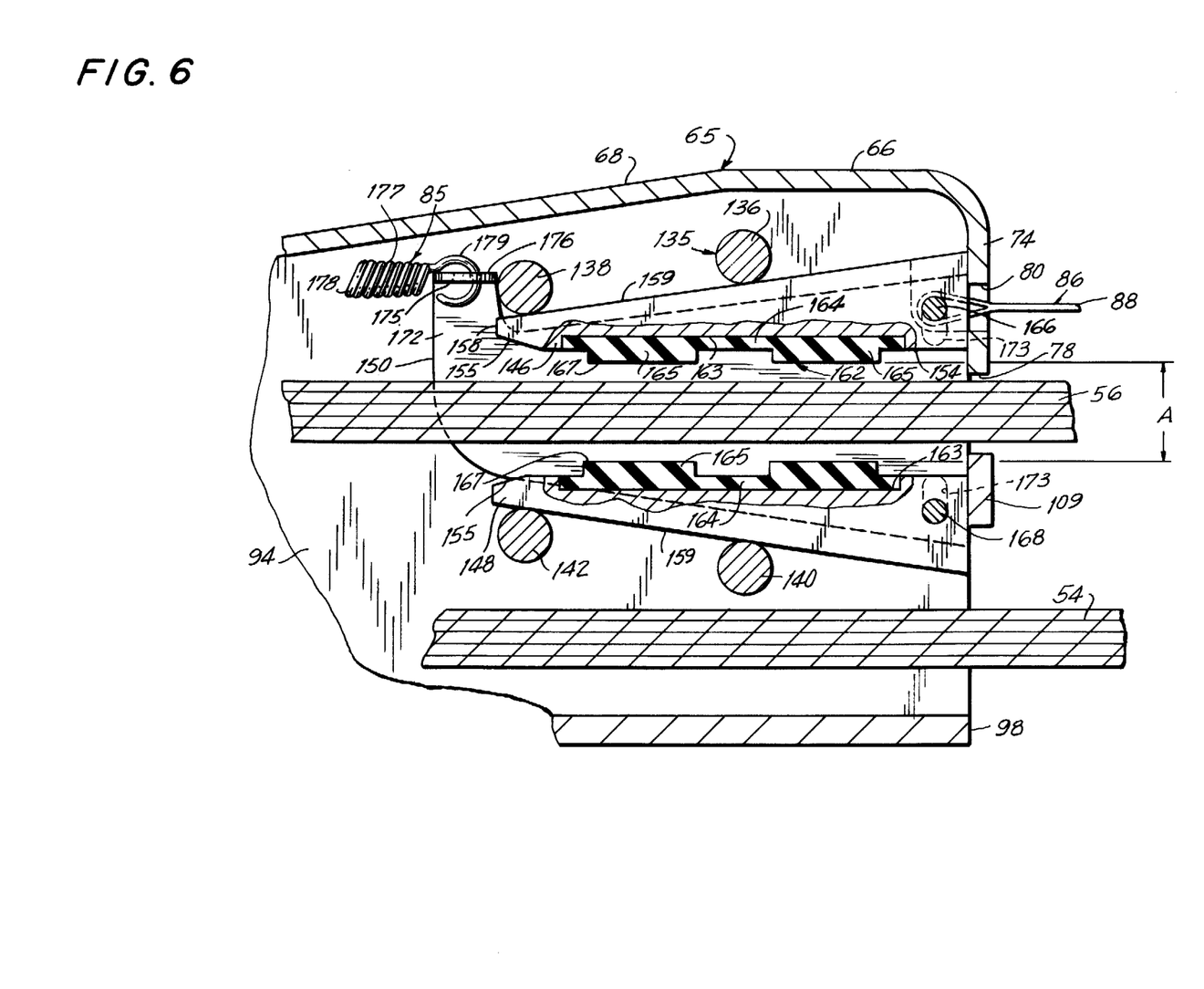
FIG. 6 is a cross-sectional view of the slide-buckle with its cooperating jaws in an unlocked position.
Figure 7:
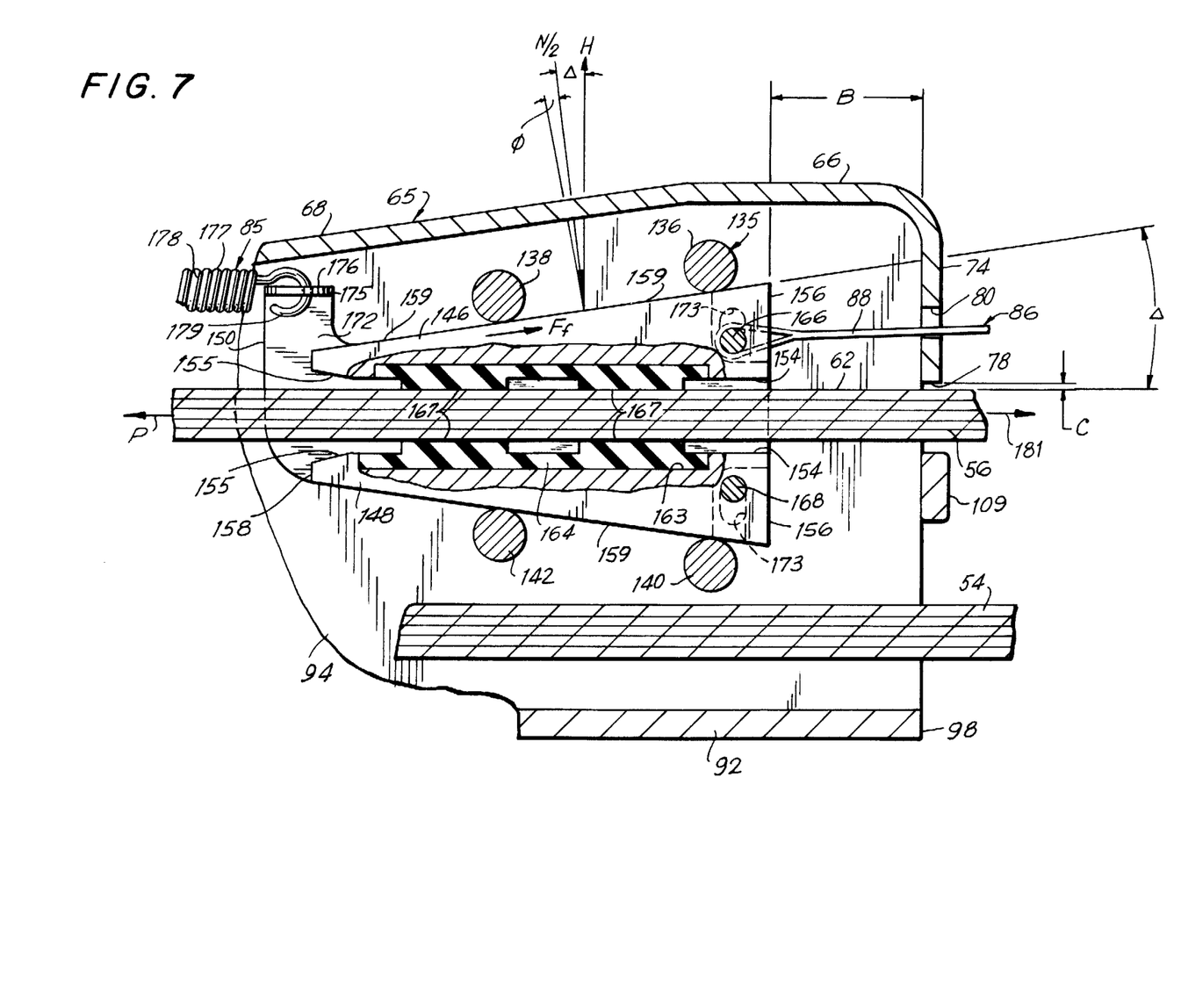
FIG. 7 is a cross-sectional view of the slide-buckle with its cooperating jaws in an extended locked position.
Figure 8:
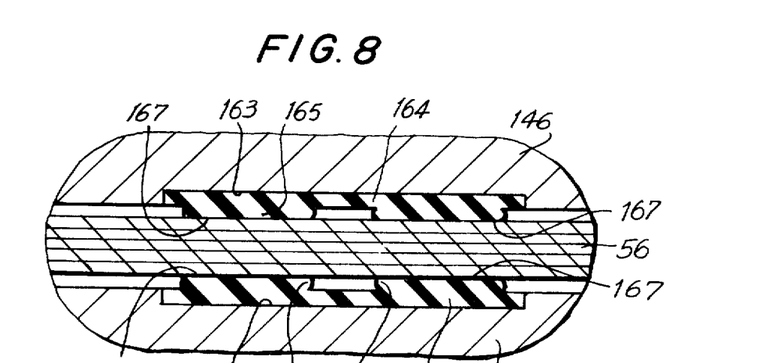
FIG. 8 is an enlarged fragmentary view of a portion of FIG. 7 showing the locked position.

As particularly seen in FIGS. 6 and 7 the clamping means 130 is adapted to move from a first or open position in which the opposing surfaces 167 of the friction means 162 are in spaced apart relationship represented by a distance A which may be in the range of 0.12 inches to 0.15 inches and that the retaining means 130 is adapted to move horizontally from the open position as seen in FIG. 6 to a closed position as seen in FIG. 7 in which the friction surface 167 comes into frictional engagement between the belt portion 56 in a manner such as to compress the belt portion 56 as particularly seen in FIG. 8. Moreover, because of the fact that the retaining means 130 is mounted such that the bearing surface 159 of the jaw members 146 and 148 are angularly disposed then the horizontal travel represented by the dimension B may be about 0.50 inches and in the range of 0.20 inches to .60 inches. In this distance, the compression factor is sufficient to compress the belt fully.

In view of the mounting arrangement of the retaining means 130 the harder the pressure outwardly applied by the torso of the individual situated therein, the greater is the force applied and since the only compressible factors are the ribs 167 then they are continuously compressed and the ribs 167 dig in even harder into the belt 56, as seen in FIG. 8, and are somewhat compressed as well as commpressing the belt and in effect greatly magnify the holding force applied. In contrast to this, as it is desired to reduce the girth that is being enclosed and if the user applies a force indicated by arrow 181 in FIG. 7 then this force, since it is in a line of motion in a plane parallel to the gripping ribs 167, will automatically release the retaining means 130 and overcome the restraining force being applied by the release means 85 attributed to springs 178. In this manner, the user without having to first engage the release means 85 has complete flexibility when it is desirous of increasing the girth or in effect moving the upper portion wherein the free length of the belt 56 extends beyond the housing means 65.

To obtain a relationship by which the slide-buckle 25 is capable of withstanding an applied force P, as illustrated in FIG. 7, which may reach 6,000 pounds and at the same time permit the simple release of the clamping means 130 a novel relationship of the component parts is obtained. The spaced apart support members 136 and 138, with respect to clamping member 146, and the support members 140 and 142, with respect to clamping member 148, define an angular relationship having an inclined plane defined by the formulas set forth below:

(1) $P = 2H \tan(\theta + \Delta)$

Where
P = applied force
H = clamp-up force
N = normal force $\perp$ to slide angle
$\theta$ = angle of repose (resultant of friction force Fp)
$\Delta$ = angle of clamping member (2) $N = P/\sin \Delta$ (3) $H = \cos \Delta (N/2)$ In this case shown when $\Delta$ is greater than $\theta$, the wedge will self-release upon the removal of the applied force P. The angle $\Delta$ may be approximately 8°, 15' when the surface finish of surface 159 and the guide rods 136, 138, 140, and 142 is at least a 32 micron finish. The range of angle $\Delta$, depending upon the surface finishes, may be in the range of 8°0' to 9°0'.

With the formulas set forth above, it is seen that the angular relationship defined by the surface 159 and surface 154 of the respective clamping members 246 and 148 play an important role in setting forth the angles required for the quick release of the clamping members 146 and 148 by movement of the belt 56 in the direction of arrow 181 (see FIG. 7).

Accordingly, the restraint or bias means which may be in the form of two springs 178 engage extensions or tabs 175 on the support members 150 and 152 and are retained in position relative to the support means 90 in the form of spaced apart flanges 94 and 96, so that tension in the springs tend to translate the entire clamping means 130 in a forward direction.

The guide means 135 including the spaced apart fixed bearing surfaces, which take the form of rods 136, 138, 140, and 142, are assembled to the side members 94 and 96 of the support means 90 and are so located as to limit the forward translation of the clamping members 146 and 148 while there is tension in the springs 178. The front wall 74 of the housing means 65 limits aftward translation of the clamping means 130 when the release means 85 is engaged by the user pulling on the gripping means 86. Also, the tabs 175 on support members 150 and 152 redundantly limit aftward translation by contacting the guide rod 138. The key function of guide rods 136, 138, 140 and 142 is to provide camming surfaces for the clamping members 146 and 148 so that any forces tending to translate the clamping members 146 and 148 forward will create verticle components of force on the clamping projections 167 thereby squeezing them together into intimate contact with the belt 56.

The upper portion of the belt assembly 56 is reeved through opening 78 in the front wall 74 of the housing means, around the aft roller 110, through the space between the clamping members 146 and 148, and out through an opening 78 in the housing means 65. The space between the clamping members 146 and 148 is ample to provide full freedom of belt slippage in and out of the openings and around the aft roller 110 during adjustment thereof.

The operation of the adjuster 25, when the gripping means 86 has not been pulled, is such that the biasing means 177 in the form of springs 178 pull the clamping members 146 and 148 forward. The sloping surface of clamping member 146 cams against the guide rods 136 and 138 and the sloping surface 159 of clamping member 148 cams against the guide rods 140 and 142. This arrangement provides verticle displacement of the clamping members 146 and 148. The elongated apertures or slots 173 in the support members 150 and 152 provide verticle freedom between the clamping members 146 and 148 such that the clamping members 146 and 148 tend to come together under the influence of the force provided by the springs 178 and, thereby sandwich the belt 56 between the parallel surfaces 154 of the clamping members 146 and 148. Upon application of a pull force upon the intermediate portion 54 of the belt 30 there is an added tendency for the clamping members 146 and 148 to be translated forward because of the force of friction between the parallel projections 167 and the surface of the belt 56. Such added forward translation causes additional vertical camming against the two pairs of guide rods 136 with 138 and 140 with 142, and thereby increases the pinching or compression action of the clamping surfaces against the belt 56. The greater the pull force of the intermediate portion 54 relative to the clamping means 130, the greater will be the pinching force; hence there can be no slippage under tension until physical damage occurs to the surface of the belt 56 and/or the clamping members 146 and 148 where they are in contact.

To minimize wear and fraying of the belt surfaces during normal use, adjusting and releasing actions frequently repeated, the surface of the clamping members 146 and 148 have been provided with a suitable material such as rubber, urethane, or fabric having projections 167. The projections 167 provide a high coefficient of friction and also have the strength to withstand the tangetial forces that will exist when the belt is under tension. The bond of the bottom portion 164 to the clamping member surface 163 must also have sufficient shearing strength for this application, and an adhesive may be used.

A key feature of this invention is the selection of a critical angle $\Delta$ for the sloping surface 159 of the clamping members 146 and 148 together with a critical set of locations for the guide rods 136, 138, 140, and 142. Although a comfortable tolerance latitude exists on the choice of angle, the angle must be chosen in accordance with the above formulas so as to exceed a critical value, below which the force required to pull the release means 85 becomes excessive. Similarly, for the locations of the guide rods 136, 138, 140, and 42, they need only be placed so their centers lie on a pair of lines parallel to the clamping member angle 159; however, in this invention they have been so placed that minimum overall height of the housing is achieved, also.

In this manner, the pair of clamping members 146 and 148 are so arranged as to pinch the belt 56 with increased force as the tension increases. The jaws act as wedges that are cammed by the slight forward motion of the belt 30 as tension increases, and the camming angle is so designed as to maximize the pinch force while maintaining a specified pull force on the release means 85 for freeing the belt after tension has been applied. The gripping surfaces 167 on the clamping members 146 and 148 which consist of rubber (or equivalent) pads whose function is to maintain strong pinching action without allowing fraying of the belt 56 as would generally occur if metallic serrated surfaces were used under certain conditions.

The clamping members 146 and 148 are movable in a first direction toward their clamping position and in the opposite direction toward their release position. The biasing means 177 is operative to maintain the clamping members 146 and 148 in their clamping position in conjunction with the angular relationship of the inclined planes. The upper inclined angular plane being defined by rods 136 and 138 for engagement with surface 159 of clamping member 146. The lower inclined plane is defined by rods 140 and 142 which acts as the bearing surface for engagement with surface 159 of clamping member 148. The guide plates 150 and 152 inter-connect the clamping members 146 and 148 so that motion of the upper or first of the clamping members 146 towards its release position moves the second or lower clamping member 148 toward its release position, and motion of the upper clamping member 146 toward its clamping position moves the lower clamping member 148 toward its clamping position. Further biasing means 177 acts simultaneously on the first and second clamping members 146 and 148 to bias them toward the clamping position.

The release of the clamping means 130, if it is desired to increase the girth, is obtained by engaging the release means 85 by gripping handle 88 and applying an outward force such that the force of the restraining means 85 is overcome and the clamping means 130 moves in a horizontal plane from its closed position in FIG. 7 to an open position in FIG. 6 permitting the necessary adjustment of the belt portion 56 as desired. It is appreciated that the restraining means may be reversed such that the increase in girth may require the releasing means to be engaged and decreased in girth could be done without need to engage the releasing means.

The holding means in the form of support shaft 110 around which the belt 30 is played is mounted relative to the clamping members 146 and 148 for registering substantially with the space provided therebetween. In this manner the belt 30 is anchored at one end thereof of support shaft 110 and then played through the adjuster 25 and around the holding means in form of shaft 112 and extending through the clamping means 130.

The relationship between the opening 78 on the forward wall 74 of the housing means 65 is placed at a level such that the spatial relationship from the upper surface 62 of the upper portion 56 or belt 30 and the surface of the opening 78 is illustrated by dimensions C (see Fig. 7) which may be in the range of 0.01 to 0.06 inches. By maintaining the space in this range it has been found that the user may apply the force outwardly or upwardly even against the opening 78 as defined by the front wall 74. By maintaining the space C in proper relationship then a sufficient portion of the force will have a horizontal component which is of sufficient magnitude to free the clamping means 130. This is important in order to avoid any instances in which the release means 85 does not function. The dimension C has to be properly maintained, if the dimension C exceeds certain prescribed limits, and if the user were to pull on the free end 58 in an upward direction, then it would not release the retaining means 130, which could produce a hazardous condition.

Accordingly, the relationship between the opening 78 and the disposition of the upper angular plane and the lower angular plane is such that a component of force sufficient to overcome the force applied by the biasing means 177 is obtained not withstanding the outward direction the flexible handle 88 is pulled.

Various other modifications are contemplated by those skilled in the art without departing from the spirit and scope of the invention as hereinafter defined by the appended claims.

We claim:

1. A restraint adjuster for a belt, comprising:
   A. housing means including a front end through which a belt may extend,
   B. support means including a base and spaced apart upwardly extending flanges removeably secured to said housing means,
   C. guide means mounted in fixed spaced apart position between said flanges of said support means, said guide means defining an upper angular bearing surface and a lower angular bearing surface, the angle of each of said respective bearing surfaces increasing towards the front end of said housing means,
   D. clamping means mounted in said housing means between said guide means, said clamping means including a pair of spaced apart clamping members positioned in overlapping relation to each other, said clamping members each including a substantially horizontally extending front surface, and a spaced apart upper surface inclined relative to said lower surface at an angle substantially equal to the bearing surface angle defined by said guide means and adapted for engagement therewith,
   E. friction means secured to the lower surface of each of said clamping members for engagement with the belt extending therebetween,
   F. mounting means for maintaining said clamping members in manipulatable spaced relation to each other, said mounting means including:
      1. a pair of spaced apart guide plates adjacent each of said flanges in a substantially vertical plane,
      2. a vertically extending channel at one end of each of said guide plates adjacent the front end of said housing means,
      3. means for engaging the opposite end of said guide plates, and
      4. means extending beyond the sides of each of said clamping members and contained within said channels to permit vertical displacement of each of said support members at one end thereof relative to each other, wherein said clamping members are movable between a first direction toward their clamping position and in a second direction toward their release position, and said guide plates inter-connect said clamping members so a motion of said guide plates in the first direction moves the upper surface of each of said clamping members against said bearing surfaces and toward each other, and motion of said guide plates in the second direction releases the clamping members from its clamping position,
   G. biasing means for urging said mounting means in the first direction towards the rear of said housing means, said biasing means including:
      1. fastening means associated with each of said flanges,
      2. a pair of spaced apart springs each connected at one end to said fastening means, and at the opposite end to said means for engaging the opposite end of said guide plates, wherein said clamping members are urged by said biasing means in the first direction against a belt contained between said overlapping front surfaces of said clamping members, and
      3. wherein said biasing means is operative in conjunction with the angular relationship defined between said inclined bearing surfaces and the upper surfaces of said clamping members to maintain said clamping members in their clamping position to wedge the belt therebetween,
   H. release means co-acting with said clamping members to retract said clamping members to the release position to permit relative movement of the belt with respect thereto,
   I. holding means in said housing means for supporting the belt relative to the clamping members about which the belt is played, said holding means registering substantially with the space between the adjacent front surfaces of said clamping members, and
   J. means in said casing for anchoring the belt at substantially one end thereof, with the adjustable belt played through the restraint adjuster and around said holding means and extnding through said clamping means and exiting from said housing means at the front end thereof.

2. A restraint adjuster as defined in claim 1,
   a. wherein the upper plane of said guide means includes spaced apart rollers extending transversely between said flanges, and
   b. wherein the lower plane of said guide means includes spaced apart rollers extending transversely between said flanges.

3. A restraint adjuster as defined in claim 1, wherein said release means includes:
   a. gripping means including a flexible member extending beyond the front end of said housing means, and
   b. means for connecting said flexible member to one of said clamping members, wherein a force applied by the user to said flexible member is sufficient to overcome the force being applied thereto by said biasing means and wherein the relative movement of said clamping members is obtained, and upon the release of said gripping means said biasing means urges said clamping members into intimate contact with the belt.

4. A restraint adjuster as defined in claim 3,
   a. wherein said housing means includes a downwardly extending front wall at the front end thereof,
   b. wherein said housing means has an elongated opening on said front wall thereof to receive said flexible member therethrough, and
   c. wherein the relationship between the elongated opening and the disposition of said angular upper plane and lower plane is such that a component of force sufficient to overcome the force applied by said biasing means is obtained not withstanding the outward direction said flexible member is pulled.

5. A restraint adjuster as defined in claim 1, wherein said clamping members further include:
   a. a beveled leading edge extending transversely to said upper surface, and
   b. a rear surface extending between said lower surface and said upper surface.

6. A restraint adjuster as defined in claim 1, wherein said friction means includes:
   a. a plurality of parallel spaced apart projections extending transversely of the belt and above the lower surface, and
   b. said projection being of a compressible material and adapted to compress under the load applied to the belt.

7. A restraint adjuster as defined in claim 1, wherein the angle of said inclined plane defined by said guide means is in the range between 8° and 9°.

8. A restraint adjuster as defined in claim 1, wherein the front end of said housing means limits the forward movement of said clamping members.

9. A restraint adjuster as defined in claim 1, wherein the travel of said clamping members towards and away from each other between the clamping position in which a force is applied against the belt, to the release position in which the belt is free to move relative thereto, is in the range of approximately 0.12 inches to 0.15 inches.

10. A restraint adjuster as defined in claim 1, wherein said housing means has openings for the threading of the belt, into, through, and out of said housing means.

11. A restraint adjuster as defined in claim 10,
   a. wherein one of said openings is formed by a bar extending transversely between said flanges, and in the assembled relation of said housing means to said support means an opening is defined through which the belt extends, and
   b. wherein said housing means is retained in fixed position relative to said support means by a plurality of fasteners extending therebetween.

12. A restraint adjuster as defined in claim 1, wherein the clamping members are movable toward their clamping position from their release position in the first direction and toward the release position from the clamping position in the opposite, second direction; and the means for moving the clamping members to their release position comprises the opposite end of the belt with one end being disposed so that a user, by pulling the belt can move the clamping members in their second direction away from their clamping position.

13. A restraint adjuster as defined in claim 1, wherein said holding means includes a shaft mounted transversely between said flanges and in spaced relation to said clamping means.

14. A restraint adjuster as defined in claim 13, wherein said shaft of said holding means is rotatably mounted to reduce the frictional force of the movement of the belt relative thereto.

15. A restraint adjuster as defined in claim 1, wherein said rollers forming said bearing surfaces are rotatably mounted to reduce the frictional force of the movement of the clamping members relative thereto.

16. A restraint adjuster for a belt, comprising:
   A. housing means including:
      1. a top wall,
      2. a downwardly extending front wall forming the front end of said housing means and having a transversely extending opening, and
      3. a pair of spaced apart side walls,
   B. support means adapted to extend within said housing means and including:
      1. a base,
      2. spaced apart upwardly extending flanges that extend within the confines of said spaced apart side walls and adjacent thereto,
      3. a bar extending transversely across said flanges to form an opening at the front end of said housing means through which the belt extends in the assembled relation of said housing means to said support means, and
      4. a plurality of fasteners extending between said housing means and said support means to join them together,
   C. guide means mounted in fixed spaced apart position between said flanges of said support means, said guide means including:
      1. an upper inclined angular bearing surface,
      2. a lower inclined angular bearing surface, the angle of each of said bearing surfaces increasing towards the front wall of said housing means and defining an angle in the range of between 8° to 9°,
      3. the upper inclined bearing surface of said guide means including a pair of spaced apart rollers extending transversely between said flanges, and
      4. the lower inclined bearing surface of said guide means including spaced apart rollers extending transversely between said flanges, D. clamping means mounted in said housing means between said guide means, said clamping means including:
 1. a pair of cooperating clamping members positioned in spaced apart overlapping relation to each other between said rollers, said clamping members each including a substantially horizontally extending front surface,
 2. a spaced apart upper surface inclined relative to said lower surface at an angle substantially equal to the angular plane defined by said pairs of rollers for engagement therewith, and
 3. said clamping members being movable between a clamping position in which they are wedged between said rollers with a belt disposed between them, and a release position in which they are unwedged,
E. friction means secured to the lower surface of each of said clamping members for engagement with the belt extending therebetween, said friction means including:
 1. a plurality of parallel spaced apart projections extending transversely of the belt and above the lower surface, and
 2. said projections being of a compressible material and adapted to compress under the load applied to the belt,
F. mounting means for maintaining said clamping members in manipulatable spaced relation to each other, said mounting means including:
 1. a pair of spaced apart guide plates to inter-connect said clamping members extending between said flanges and the ends of said clamping members in a substantially vertical plane,
 2. said guide plates each including a vertically extending channel at one end thereof adjacent the front end of said housing means,
 3. means for engaging the opposite end of said guide plates,
 4. means extending beyond the sides of each of said clamping members and contained within said channels to permit vertical displacement of each of said support members at one end thereof relative to each other,
 5. wherein the horizontal travel of said clamping members from a clamping position in which a force is applied against the belt to a release position in which the belt is free to move relative thereto is in the range of approximately 0.20 inches to 0.60 inches, and
 6. wherein the front wall of said housing means limits the forward movement of said clamping members,
G. biasing means for urging said mounting means in a direction towards the rear of said housing means, said biasing means including:
 1. fastening means associated with each of said flanges,
 2. a pair of spaced apart springs each connected at one end to said supporting means and at the opposite end to one of said guide plates, wherein said clamping members are urged by said biasing means in the clamping position against a belt contained between said overlapping front surfaces of said clamping members, and
 3. wherein said biasing means is operative in conjunction with the angular relationship defined between said inclined bearing surfaces and the upper surfaces of said clamping members to maintain said clamping members in their clamping position,
H. release means co-acting with said clamping members to retract said clamping members to the release position to permit relative movement of the belt with respect thereto, said release means including:
 1. gripping means including a flexible member extending beyond the front wall of said housing means,
 2. means for connecting said flexible member to one of said clamping members, wherein a force applied by the user to said flexible member is sufficient to overcome the force being applied thereto by said biasing means and wherein the relative movement of said clamping members is obtained, and upon the release of said gripping means said biasing means urges said clamping members into intimate contact with the belt, and
 3. wherein the relationship between the opening and the disposition of said upper bearing surface and lower bearing surface is such that a component of force sufficient to overcome the force applied by said biasing means is obtained not withstanding the outward direction in which said flexible member is pulled,
I. holding means in said housing means for supporting the belt relative to the clamping members about which the belt is played, said holding means registering substantially with the space between the adjacent front surfaces of said clamping members, said holding means including a shaft mounted transversely between said flanges and in spaced relation to said clamping means, and
J. means in said casing for anchoring the belt at substantially one end thereof, with the adjustable belt played through said adjuster and around said holding means and extending through said clamping means and exiting from said housing means at the front end thereof.

17. A restraint adjuster as defined in claim 16, wherein said clamping members further include:
 a. a beveled leading edge extending transversely to said upper surface, and
 b. a rear surface extending between said lower surface and said upper surface.

18. A restraint adjuster as defined in claim 16, wherein said friction means is secured to said front surface by an adhesive.

19. A restraint adjuster as defined in claim 16, wherein the travel of said clamping members towards and away from each othe between the clamping position in which a force is applied against the belt, to the release position in which the belt is free to move relative thereto, is in the range of approximately 0.12 inches to 0.15 inches.

20. A restraint adjuster as defined in claim 16, wherein said housing means has openings for the threading of the belt, into, through, and out of said housing means.

21. A restraint adjuster as defined in claim 16, wherein the clamping members are movable toward their clamping position from their release position in a first direction and toward the release position from the clamping position in the opposite, second direction; and the means for moving the clamping members to their release position comprises the opposite end of the belt with one end being disposed so that a user, by pulling the belt can move the clamping members in their second direction away from their clamping position.

22. A restraint adjsuter as defined in claim 16, wherein said shaft of said holding means is rotatably mounted to reduce the frictional force of the movement of the belt relative thereto.

23. A restraint adjuster as defined in claim 16, wherein said rollers forming said bearing surfaces are rotatably mounted to reduce the frictional force of the movement of the clamping members relative thereto.

24. A restraint adjuster as defined in claim 16, wherein said means for engaging the opposite end of said guide plates includes:
   a. a tab portion on each of said guide plates extending inwardly within said housing means, and
   b. an aperture extending within each of said tabs for receiving one end of said springs.

25. A restraint adjuster as defined in claim 16, wherein said fastening means associated with each of said flanges includes a bar extending therebetween.

26. A restraint adjuster for a belt, comprising:
   A. housing means including:
      1. a top wall,
      2. a downwardly extending front wall forming the front end of said housing means and having a transversely extending opening, and
      3. a pair of spaced side walls,
   B. support means adapted to extend within said housing means and including:
      1. a base,
      2. spaced apart upwardly extending flanges that extend within the confines of said spaced apart side walls and adjacent thereto,
      3. a bar extending transversely across said flanges to form an opening at the front end of said housing means through which the belt extends in the assembled relation of said housing means to said support means, and
      4. a plurality of fasteners extending between said housing means and said support means to join them together,
   C. guide means mounted in fixed spaced apart position between said flanges of said support means, said guide means including:
      1. an upper inclined angular bearing surface,
      2. a lower inclined angular bearing surface, the angle of each of said bearing surfaces increasing towards the front wall of said housing means and defining an angle in the range of between 8° to 9°,
      3. the upper inclined bearing surface of said guide means including a pair of spaced apart rollers extending transversely between said flanges,
      4. the lower inclined bearing surface of said guide means including spaced apart rollers extending transversely between said flanges, and
      5. wherein said rollers forming said bearing surfaces are rotatably mounted to reduce the frictional force of the movement of the clamping members relative thereto,
   D. clamping means mounted in said housing means between said guide means, said clamping means including:
      1. a pair of cooperating clamping members positioned in spaced apart overlapping relation to each other between said rollers, said clamping members each including a substantially horizontally extending front surface,
      2. a spaced apart upper surface inclined relative to said lower surface at an angle substantially equal to the angular plane defined by said pairs of rollers for engagement therewith, and
      3. a clamping members being movable between a clamping position in which they are wedged between said rollers with a belt disposed between them, and a release position in which they are unwedged,
   E. friction means secured to the lower surface of each of said clamping members for engagement with the belt extending therebetween, said friction means including:
      1. a plurality of parallel spaced apart projections extending transversely of the belt and above the lower surface, and
      2. said projections being of a compressible material and adapted to compress under the load applied to the belt,
   F. mounting means for maintaining said clamping members in manipulatable spaced relation to each other, said mounting means including:
      1. a pair of spaced apart guide plates to inter-connect said clamping members extending between said flanges and the ends of said clamping members in a substantially vertical plane, wherein the travel of said clamping members towards and away from each other, in the vertical plane between the clamping position in which a force is applied against the belt, to the release position in which the belt is free to move relative thereto, is in the range of approximately 0.12 inches to 0.15 inches,
      2. said guide plates each including a vertically extending channel at one end thereof adjacent the front end of said housing means,
      3. means for engaging the opposite end of said guide plates,
      4. means extending beyond the sides of each of said clamping members and contained within said channels to permit vertical displacement of each of said support members at one end thereof relative to each other,
      5. wherein the horizontal travel of said clamping members from a clamping position in which a force is applied against the belt to a release position in which the belt is free to move relative thereto is in the range of approximately 0.20 inches to 0.60 inches, and
      6. wherein the front wall of said housing means limits the forward movement of said clamping members,
   G. biasing means for urging said mounting means in a direction towards the rear of said housing means, said biasing means including:
      1. fastening means associated with each of said flanges,
      2. a pair of spaced apart springs each connected at one end to said supporting means and at the opposite end to one of said guide plates, wherein said clamping members are urged by said biasing means in the clamping position against a belt contained between said overlapping front surfaces of said clamping members, and
      3. wherein said biasing means is operative in conjunction with the angular relationship defined between said inclined bearing surfaces and the upper surfaces and said clamping members to maintain said clamping members in their clamping position,
H. release means co-acting with said clamping members to retract said clamping members to the release position to permit relative movement of the belt with respect thereto, said release means including:
   1. gripping means including a flexible member extending beyond the front wall of said housing means,
   2. means for connecting said flexible member to one of said clamping members, wherein a force applied by the user to said flexible member is sufficient to overcome the force being applied thereto by said biasing means and wherein the relative movement of said clamping members is obtained, and upon the release of said gripping means said biasing means urges said clamping members into intimate contact with the belt, and
   3. wherein the relationship between the opening and the disposition of said upper bearing surface and lower bearing surface is such that a component of force sufficient to overcome the force applied by said biasing means is obtained not withstanding the outward direction in which said flexible member is pulled,
I. holding means in said housing means for supporting the belt relative ot the clamping members about which the belt is played, said holding means registering substantially with the space between the adjacent front surfaces of said clamping members, said holding means including a shaft mounted transversely between said flanges and in spaced relation to said clamping means, and
J. means in said casing for anchoring the belt at substantially one end thereof, with the adjustable belt played through said adjuster and around said holding means and extending through said clamping means and exiting from said housing means at the front end thereof, wherein the clamping members are movable toward their clamping position from their release position in a first direction and toward the release position from the clamping position in the opposite, second direction; and the means for moving the clamping members to their release position comprises the opposite end of the belt with one end being disposed so that a user, by pulling the belt can move the clamping members in their second direction away from their clamping position.

27. A restraint adjuster as defined in claim 26, wherein said clamping members further include:
   a. a beveled leading edge extending transversely to said upper surface, and
   b. a rear surface extending betweeen said lower surface and said upper surface.

28. A restraint adjuster as defined in claim 26, wherein said shaft of said holding means is rotatably mounted to reduce the frictional force of the movement of the belt relative thereto.

29. A restraint adjuster as defined in claim 26, wherein said means for engaging the opposite end of said guide plates includes:
   a. a tab portion on each of said guide plates extending inwardly within said housing means, and
   b. an aperture extending within each of said tabs for receiving one end of said springs.

30. A restraint adjuster as defined in claim 26, wherein said fastening means associated with each of said flanges includes a bar extending therebetween.

* * * * *